US012129013B2

(12) United States Patent
Borges et al.

(10) Patent No.: US 12,129,013 B2
(45) Date of Patent: Oct. 29, 2024

(54) AIRCRAFT WINDOW HEATING SYSTEM WITH REGULATED DC VOLTAGE

(71) Applicant: EMBRAER S.A., São José dos Campos (BR)

(72) Inventors: Cleber Augusto Borges, São José dos Campos (BR); Gustavo Amaral Ferreira De Melo, São José dos Campos (BR); Pedro Henrique Silva Miranda, São José dos Campos (BR); Nelson Whitaker Filho, São José dos Campos (BR)

(73) Assignee: Embraer S.A., São José dos Campos-SP (BR)

( * ) Notice: Subject to any disclaimer, the term of this patent is extended or adjusted under 35 U.S.C. 154(b) by 891 days.

(21) Appl. No.: 16/972,408

(22) PCT Filed: Jun. 6, 2018

(86) PCT No.: PCT/BR2018/000030
§ 371 (c)(1),
(2) Date: Dec. 4, 2020

(87) PCT Pub. No.: WO2019/232598
PCT Pub. Date: Dec. 12, 2019

(65) Prior Publication Data
US 2021/0229793 A1      Jul. 29, 2021

(51) Int. Cl.
*B64C 1/14*     (2006.01)
*H05B 1/02*     (2006.01)
*H05B 3/86*     (2006.01)

(52) U.S. Cl.
CPC ........ *B64C 1/1476* (2013.01); *H05B 1/0236* (2013.01); *H05B 3/86* (2013.01)

(58) Field of Classification Search
CPC ........ B64C 1/1476; H05B 1/0236; H05B 3/86
USPC ................................................. 219/203, 202
See application file for complete search history.

(56) References Cited

U.S. PATENT DOCUMENTS

| | | | | | |
|---|---|---|---|---|---|
| 4,357,524 | A | * | 11/1982 | Apfelbeck ............... | H05B 3/84 219/490 |
| 4,434,358 | A | * | 2/1984 | Apfelbeck ............... | H05B 3/84 327/332 |
| 5,072,098 | A | * | 12/1991 | Matthews ............. | H02J 7/1438 219/508 |

FOREIGN PATENT DOCUMENTS

| | | | | |
|---|---|---|---|---|
| EP | 0991301 A1 | * | 5/1993 | |
| EP | 1 318 697 | | 6/2003 | |
| EP | 1318697 A1 | * | 6/2003 | ........... H05B 1/0236 |
| GB | 1 432 862 | | 4/1976 | |
| GB | 2 261 333 | | 5/1993 | |
| GB | 2261333 A | * | 5/1993 | .......... H02M 3/3372 |
| JP | H10144455 A | * | 5/1998 | |

OTHER PUBLICATIONS

International Search Report for PCT/BR2018/000030 mailed Feb. 19, 2019, 3 pages.

(Continued)

*Primary Examiner* — Nathaniel E Wiehe
*Assistant Examiner* — Alba T Rosario-Aponte
(74) *Attorney, Agent, or Firm* — Nixon & Vanderhye P.C.

(57) ABSTRACT

The example non-limiting technology herein provides an alternative way to control window heater temperature by delivering to the heater a DC voltage with variable level.

20 Claims, 5 Drawing Sheets

(56) References Cited

OTHER PUBLICATIONS

Written Opinion of the ISA for PCT/BR2018/000030 mailed Feb. 19, 2019, 8 pages.

* cited by examiner

AIRCRAFT WINDOW HEATING SYSTEM WITH REGULATED DC VOLTAGE

CROSS-REFERENCE TO RELATED APPLICATIONS

None.

STATEMENT REGARDING FEDERALLY SPONSORED RESEARCH OR DEVELOPMENT

None.

FIELD

The technology herein relates to electronic controllers used for windshield or window heating systems e.g., in aircraft.

BACKGROUND & SUMMARY

Window anti-icing, deicing, and defogging systems are used to keep windshield areas free of ice, frost, and fog. These can be electric, pneumatic, or chemical depending on the type and complexity of the aircraft.

High performance and transport category aircraft windshields are typically made of laminated glass, polycarbonate, or similar ply material 110, 114, 118 of FIG. 1B. Typically clear vinyl plies 116 are also included to improve performance characteristics. The laminations create the strength and impact resistance of the windshield assembly. The laminated construction facilitates the inclusion of electric heating elements into the glass layers, which are used to keep the windshield clear of ice, frost, and fog. The elements can be in the form of resistance wires or a transparent conductive material 112 may be used as one of the window plies 110, 114, 118 of FIG. 1B. To ensure enough heating is applied to the outside of the windshield 102, heating elements are often placed on the inside of the outer glass ply 118.

Whether resistance wires or a laminated conductive film is used, aircraft window heat systems often have transformers to supply power and feedback mechanisms, such as thermistors, to provide a window heat control unit with information used to keep operating temperature within acceptable limits. Some systems are automatic while others are controlled by cockpit switches. Separate circuits for pilot and co-pilot are common to ensure visibility in case of a malfunction. See Ice and Rain Protection, https://www.faa-.gov/regulations_policies/handbooks_manuals/aircraft/amt_airfra me_handbook/media/ama_Chl 5.pdf While much work has been done in the past, further improvements are possible.

BRIEF DESCRIPTION OF THE DRAWINGS

The following detailed description of exemplary non-limiting illustrative embodiments is to be read in conjunction with the drawings of which.

DETAILED DESCRIPTION OF PREFERRED EMBODIMENTS

Figure 1A:
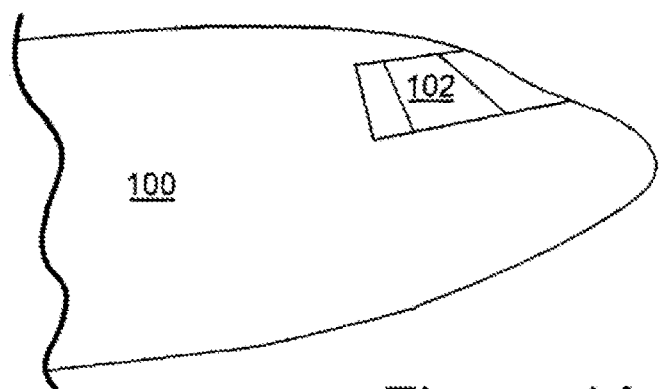
FIG. 1A shows an example non-limiting aircraft windshield.

FIG. 1A shows an aircraft 100 including a heated windshield 102. Current aircraft electrical window or windshield heating systems are commonly designed to operate in accordance with the mains electrical generation type: alternating current (AC) or direct current (DC). Larger aircraft generally use AC electrical systems whereas smaller aircraft generally use DC electrical systems. The window heater of a DC system aircraft generally uses a filament heater type, due to low resistance needed for power dissipation on the windshield.

Figure 1B:
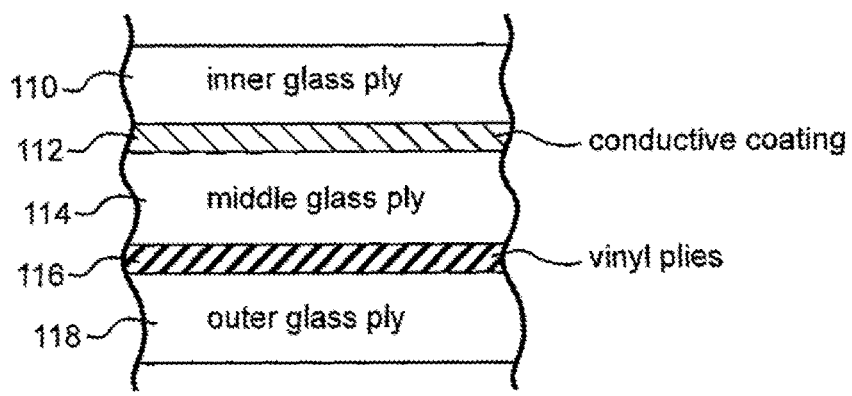
FIG. 1B is a cross-section of the example FIG. 1A windshield.

In case of an AC system, the window heater element is often made of a thin and uniform film 112 embedded within the transparent material. See FIG. 1B. The controller unit for an AC system aircraft basically is designed to deliver a sinusoidal signal with a phase shift. This phase shift is controlled according to the heater temperature (which may be monitored for example by a temperature sensor such as a thermistor), so the heater temperature will be almost constant during operation.

The heater controller unit for a DC system aircraft often provides two different types of control: ON-OFF, and variable Pulse Width Modulation:

1) ON-OFF: the controller is designed to keep the heater temperature within two temperature limits, there being a significant temperature difference between the two temperature limits. However, this temperature difference is enough to cause, under some flight conditions, an optical diffraction in the windshield, due to the temperature gradient made by external temperature and heater temperature. This effect occurs until the window temperature stabilizes, but it may disturb the pilot's vision for a few seconds.

2) Pulse width modulation (PWM): the controller delivers to the heater a switched power, with the signal width (i.e., the width of a period power signal) being controlled according to the heater temperature. Using PWM, the heater temperature tends to be constant. A drawback of this solution is that often, depending on the size of the windshield and the heat output of the heater, a high power (large current) needs to be switched. Periodically switching a high power potentially generates excessive electromagnetic interference to other aircraft systems.

The example non-limiting technology herein provides an alternative way to control window heater temperature by delivering to the heater a DC voltage with variable level.

Figure 1C:
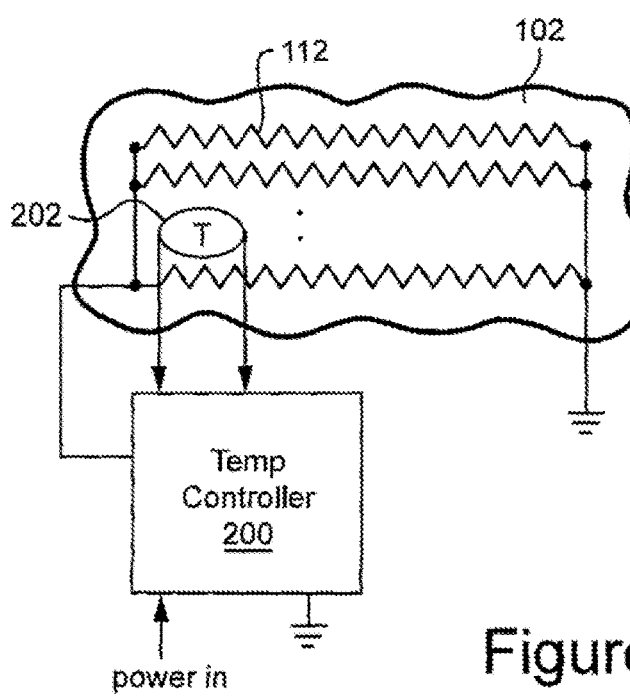
FIG. 1C is a block diagram of an example window heating system.

FIG. 1C shows a proposed heating system comprising a DC electrical supply such as a 28V DC bus 206, window heating resistive elements 112 with embedded temperature sensing elements 202, an electronic controller 200 to control the power delivered to the heating elements based on current heater temperature, and, power contactors 302 connected between DC power supply and electronic controller 200, commanded by the controller whenever is appropriate.

Figure 2:
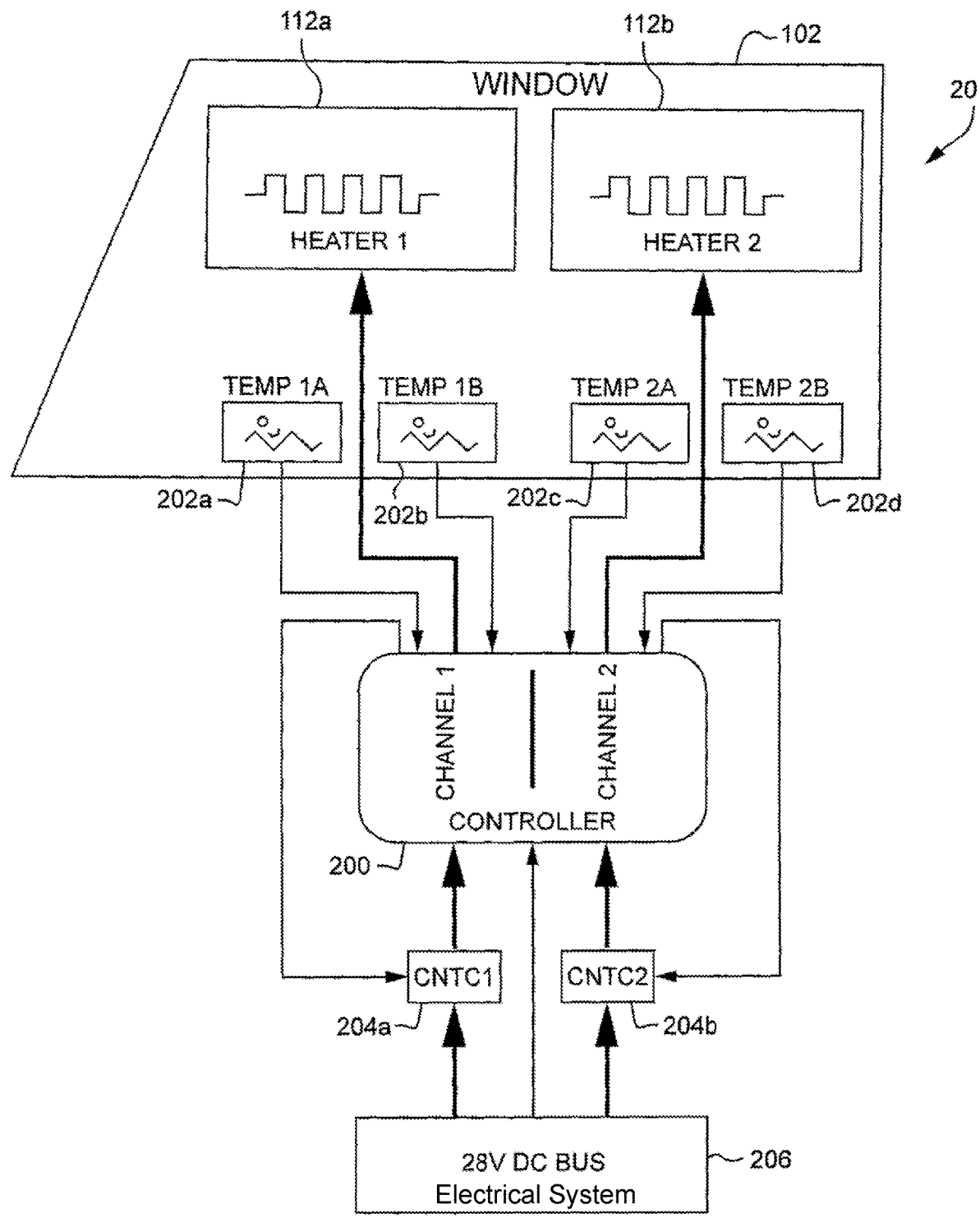
FIG. 2 is a block diagram of an example two-channel window heating controller.

FIG. 2 shows a system 20 including a window 102 with a first heater 112a and a second heater 112b. The first and second heaters 112a, 112b are respectively connected to channels 1 and 2 of a controller 200. Temperature sensors 202a ("TEMP 1A"), 202b ("TEMP 1B") provide inputs to controller CHANNEL 1, and temperature sensors 202c ("TEMP 2A"), 202d ("TEMP 2B") provide inputs to controller CHANNEL 2. A 28V DC BUS 206 provides outputs to each of power contactors CNTC1 204a, CNTC2 204b, and directly to controller 200. The controller 200 provides outputs to each of CNTC1 204a, CNTC2 204b.

Figure 3:
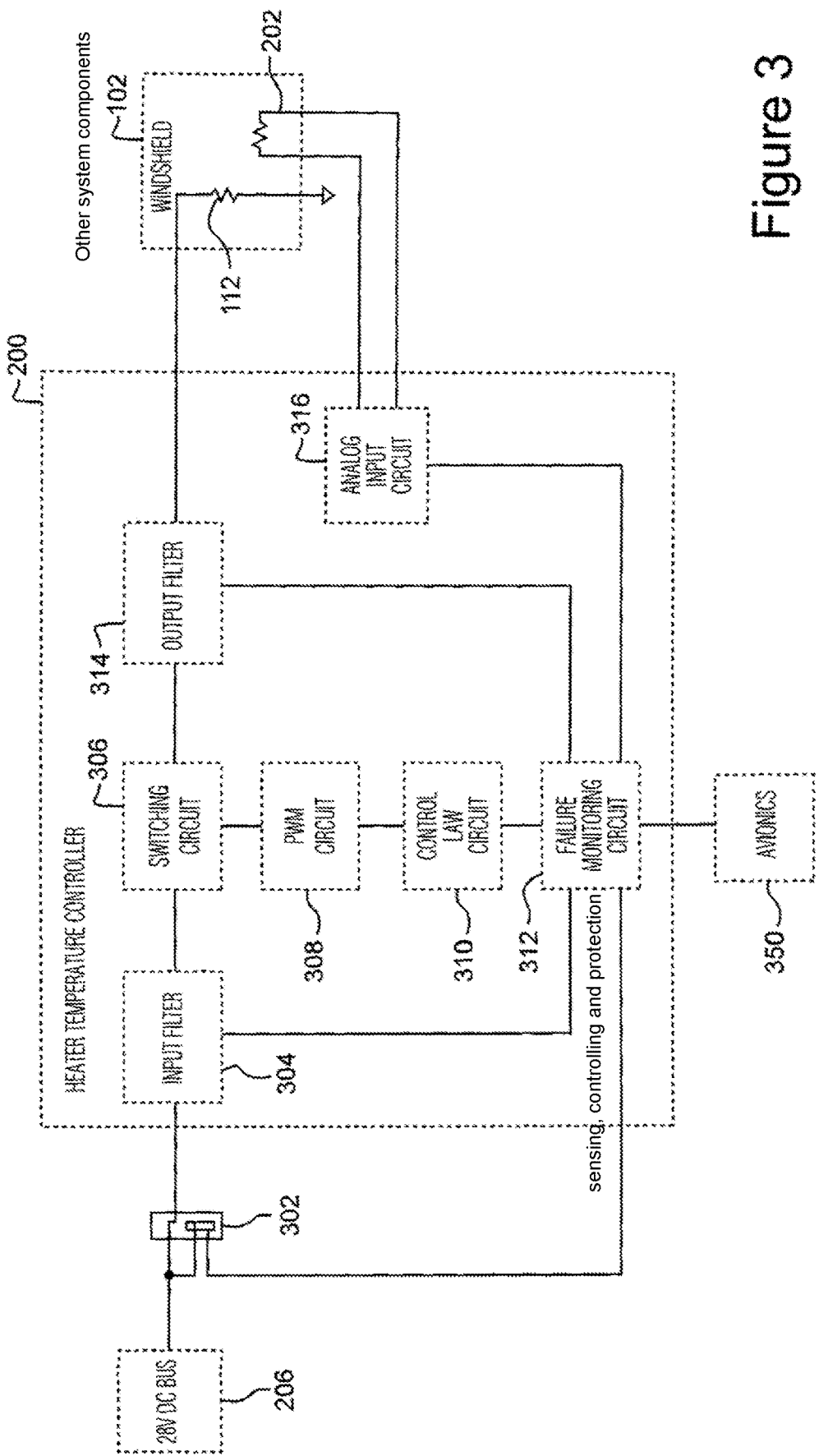
FIG. 3 is a more detailed block circuit diagram of the example window heating controller.

As shown in FIG. 3, the heater controller 200 is composed by: an input LC type filter 304, a high power and high frequency switch 306, an output LC filter 314, analog signals reading circuit 314 connected to a temperature sensor 202 embedded in the windshield 102, a Control Law circuit 310 for error calculation and control of a high frequency PWM signal via a PWM circuit 308, and, a failure monitor circuit 312 (13) for misbehavior detect of each system component connected to avionics 350 and to power contactors 302.

Figure 4A:
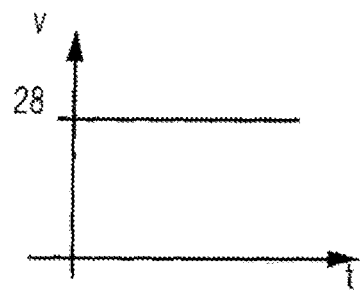
FIG. 4A is a signal diagram showing incoming DC voltage.
Figure 4B:
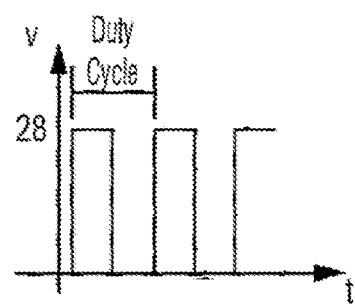
FIG. 4B is a signal diagram showing the output of switching circuit 306.
Figure 4C:
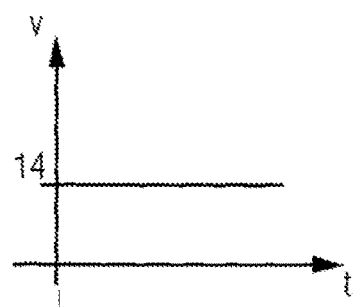
FIG. 4C is a signal diagram showing the output of output filter 314.

The input voltage to the controller must be within 20-30 VDC range (see FIG. 4A), so the output voltage will be between 0V and the input voltage value less the internal drop voltage. This output is possible through a circuit based on a high frequency PWM signal switching a MOSFET gate, getting a 28V level switched right after the said MOSFET (see FIG. 4B). Then, the switched voltage is transformed to the mean DC level (see FIG. 4C) by the output filter. In addition, the input voltage pass through an input filter 304 also before being switched by MOSFETs, to guarantee there is no harmonics being conducted to the electrical supply bus.

The duty cycle of the PWM signal may vary from 0% to 100%, this percentage will be controlled by Control Law circuit 310. The output from Control Law circuit is a 0-1 V signal that controls a PWM circuit 308, which will generate a PWM signal with a duty cycle proportional to this input signal. The Control Law circuit 308 receives the temperature reading signal and calculates the error compared to a reference temperature (38° C.). The temperature reading is made by a proper analog conditioning circuit 316, giving a signal proportional to the temperature sensor resistance. However, this temperature signal is monitored by a dedicated circuit 312 in order to detect if it is still in valid range or unwanted value (overheat). Also, this circuit 312 monitors the output current and input voltage, in order to avoid operating in failure conditions.

Figure 5:
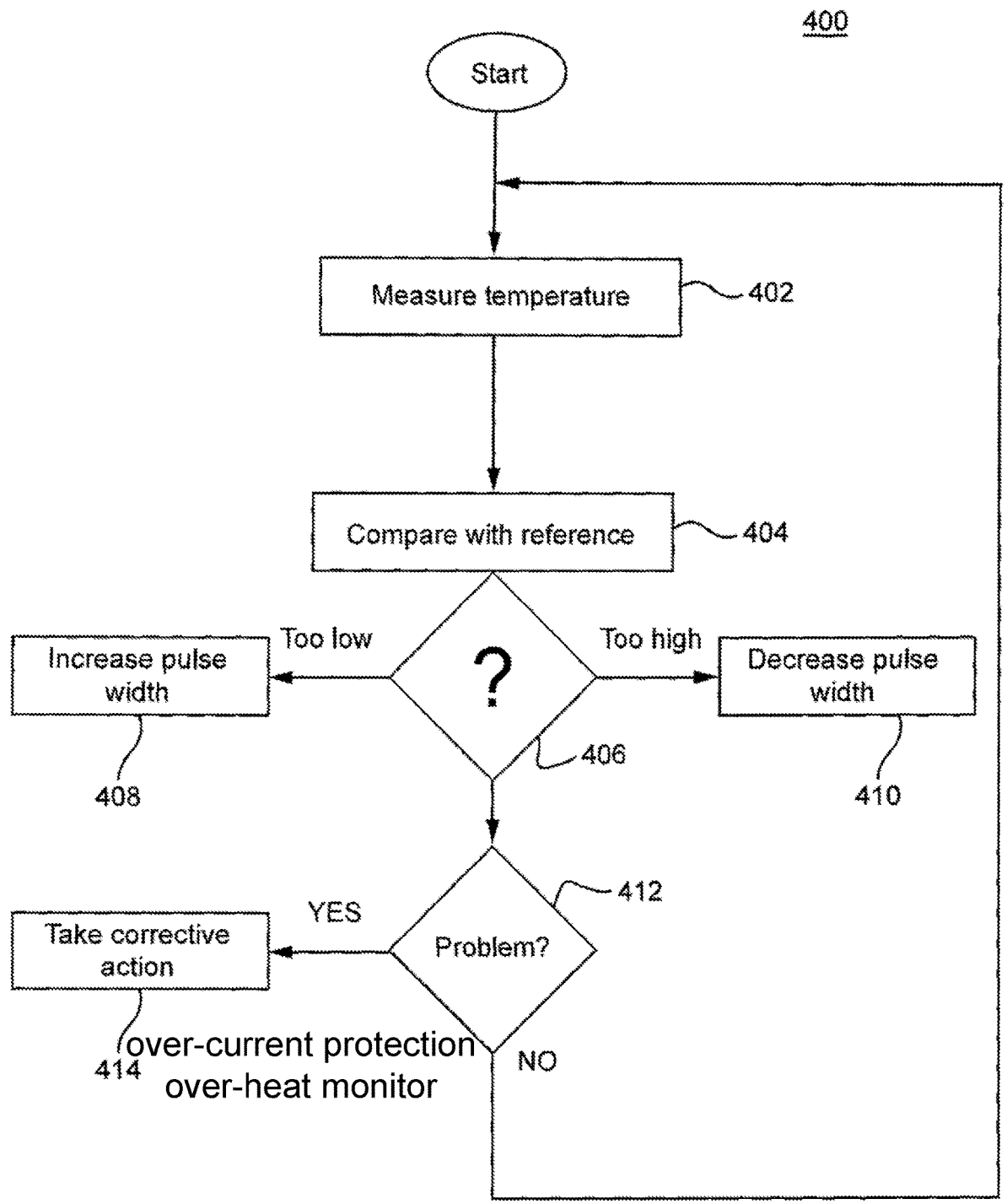
FIG. 5 is a flowchart of operations performed.

FIG. 5 is a flowchart of a sequence 400 of operations performed by the above, including "measure temperature" (402), "compare with reference" 404, decision 406, "increase pulse width" 408 if "too low", "decrease pulse width" 410 if "Too high", detect "problem"?" 412, and if yes, "take corrective action" 414.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:
1. An aircraft window heat controller system comprising:
 an Electrical connection supplying a DC power input of 28 VDC in one or more independent busses;
 a controller capable to receive 28 VDC power input from the one or more independent busses and to output a DC voltage regulated between 0 and 28 VDC for first and second independent heating elements, output which is regulated according to a sensed temperature, including over-current protection and over-heat monitoring;
 power contactors for controlled power supply shut-off made by said controller; and
 wherein the first independent heating element comprises an electrical resistance heating element connected to receive controlled power from said controller with an embedded temperature sensor for developing a temperature sensing signal proportional to a temperature sensed for said first independent heating element.

2. The aircraft window heat controller system, as in claim 1, wherein the controller comprises:
 a switch to switch the DC power input in a fixed frequency being gating by a pulse width modulation (PWM) signal with a variable duty cycle;
 an input filter connected before said switch for attenuating harmonics being returned to power the one or more independent busses;
 an output filter connected after said switch for changing the switched DC power input to a proportional DC voltage level according to the variable duty cycle of said pulse width modulation signal, and also for attenuating harmonics being delivered to the said electrical resistance heating element; and,
 a sensing, controlling and protection circuit that uses said embedded temperature sensor, output current delivered from the output filter and an input filter voltage level, for keeping the first independent heating element temperature constant, protected against over-heat and over-current.

3. The aircraft window heat controller system in accordance with claim 2 further comprising:
 an analog signal conditioning circuit receiving a temperature sensing signal, the output current and the input filter voltage level and converting them to an appropriate DC signal level;
 a failure monitoring circuit capable to detect misbehavior of the controller or other system components with proper indication for each kind of failure through output signals and proper command of said power contactors;
 a processing circuit that applies a control law monitoring the temperature sensing signal indicating a current sensed temperature level of the first heating element and acting to correct a current temperature to a predetermined level, keeping sensed temperature level as constant as possible; and
 a PWM signal circuit to generate the PWM signal with the duty cycle proportional to a control signal indicated by said control law.

4. An aircraft window heat controller for delivering controlled direct current to an electrical resistance heating element disposed within a window of an aircraft, the window including an embedded temperature sensor to develop a signal proportional to temperature, the aircraft window heat controller adapted for connection to an aircraft electrical bus supplying a direct current input of between 20 and 30 VDC through power contactors, the aircraft window heater controller comprising:
 a regulator circuit that receives the direct current input supplied by the aircraft electrical bus and produces a DC output regulated between 0 and 28 VDC to power the electrical resistance heating element, the regulator circuit regulating the DC output supplied to the electrical resistance heating element according to temperature sensed by the embedded temperature sensor.

5. The aircraft window heat controller of claim 4, wherein the regulator circuit comprises a switching circuit connected to switch the received direct current input supplied by the aircraft electrical bus at a fixed frequency gated by a pulse width modulation (PWM) signal with a variable duty cycle to provide a switched signal, and an output LC circuit to transform the switched signal to a mean DC level for supplying the electrical resistance heating element.

6. The aircraft window heat controller of claim 5, further comprising:
an input filter connected between the received direct current input supplied by the aircraft electrical bus and the switching circuit, to attenuate harmonics being returned to the aircraft electrical bus; and
an output filter connected between the switching circuit and the electrical resistance heating element, to change the switched received input to a proportional DC output according to the variable duty cycle, and also for attenuating harmonics generated by said switching circuit being delivered to the electrical resistance heating element.

7. The aircraft window heat controller of claim 6 further comprising a sensing, controlling and protection circuit that uses the embedded temperature sensor, current delivered by said output filter and current delivered by said input filter, to keep a temperature of the first electrical resistance heating element constant and protected against over-heat and over-current.

8. The aircraft window heat controller of claim 4 further comprising:
an analog signal conditioning circuit converting a temperature sensing signal from the embedded temperature sensor to an operable signal level.

9. The aircraft window heat controller of claim 4 further comprising:
a failure monitoring circuit capable to detect misbehavior of the controller or system components with indication for each kind of failure through output signals and associated command of said power contactors.

10. The aircraft window heat controller of claim 4 further comprising:
a processing circuit that applies a control law monitoring a sensed temperature level of the electrical resistance heating element and acting to correct temperature of the electrical resistance heating element to a predetermined temperature, keeping corrected temperature as constant as possible.

11. The aircraft window heat controller of claim 10 further comprising a PWM signal circuit to generate a PWM signal with a duty cycle proportional to a control signal indicated by the control law.

12. The aircraft window heat controller of claim 11 wherein the control law receives a temperature reading from the embedded temperature sensor, compares the temperature reading with a reference temperature, and calculates an error.

13. The aircraft window heat controller of claim 12 wherein the reference temperature is 38° Centigrade.

14. The aircraft window heat controller of claim 10 further including a dedicated circuit to monitor the temperature sensed by the embedded temperature sensor to detect if the temperature reading is within a valid range or has an unwanted value indicating an overheat condition.

15. The aircraft window heat controller of claim 14 wherein the dedicated circuit monitors output current and input voltage, to avoid operating in failure conditions.

16. The aircraft window heat controller of claim 4 wherein the electrical resistance heating element comprises a conductive coating between plies of a multi-ply window of the aircraft.

17. The aircraft window heat controller of claim 4 wherein the regulator circuit has first and second channels, the first channel controlling a first electrical resistance heating element disposed within the window of the aircraft, the second channel controlling a second electrical resistance heating element different from the first electrical resistance heating element, disposed within the window of the aircraft.

18. The aircraft window heat controller of claim 4 wherein the regulator circuit includes a control law circuit connected to receive a temperature signal produced by a conditioning circuit, the temperature signal being proportional to resistance of the embedded temperature sensor, the control law circuit to calculate error of the temperature signal compared to a reference temperature and to control a variable duty cycle of a pulse width modulation (PWM) signal applied to regulate level of the regulated DC output.

19. The aircraft window heat controller of claim 18 further including a monitoring circuit connected to monitor whether the signal proportional to resistance of the embedded temperature sensor and an associated circuit is in a valid range.

20. A method of delivering a controlled direct current output to an electrical resistance heating element disposed within a window of an aircraft, the window including an embedded temperature sensor to develop a temperature signal proportional to heating temperature produced by the electrical resistance heating element, the aircraft including an aircraft electrical bus supplying a direct current input through power contacts, the method comprising:
sensing temperature with a temperature sensor embedded in the aircraft window; and
using pulse width modulation to convert the direct current input to a variable DC output regulated to a maximum of 28 VDC and applying the variable DC output to the electrical resistance heating element, including varying a duty cycle of the pulse width modulation to regulate the variable DC output according to the temperature signal produced by the embedded temperature sensor.

\* \* \* \* \*